United States Patent [19]
Millar et al.

[11] Patent Number: 5,335,275
[45] Date of Patent: Aug. 2, 1994

[54] TELEVISION SCRAMBLER

[75] Inventors: David J. Millar; Stephen J. Greenhalgh; Richard P. Gregory, all of Northampton, United Kingdom

[73] Assignee: DCE Voice Processing Limited, Buckinghamshire, United Kingdom

[21] Appl. No.: 923,948
[22] PCT Filed: Mar. 5, 1991
[86] PCT No.: PCT/GB91/00343
§ 371 Date: Sep. 4, 1992
§ 102(e) Date: Sep. 4, 1992
[87] PCT Pub. No.: WO91/14341
PCT Pub. Date: Sep. 19, 1991

[30] Foreign Application Priority Data

Mar. 5, 1990 [GB] United Kingdom ............ 9004901.6

[51] Int. Cl.⁵ ............................................. H04N 7/167
[52] U.S. Cl. .......................................... 380/4; 380/20; 380/33; 380/36
[58] Field of Search .................... 380/20, 14, 33, 36

[56] References Cited

U.S. PATENT DOCUMENTS

| | | | |
|---|---|---|---|
| 4,275,265 | 6/1981 | Davida et al. | 340/348 |
| 4,563,702 | 1/1986 | Heller et al. | 358/119 |
| 4,663,659 | 5/1987 | Blatter | 380/14 |
| 4,691,352 | 9/1987 | Arragon et al. | 380/14 |
| 4,910,772 | 3/1990 | Matias et al. | 380/20 |

FOREIGN PATENT DOCUMENTS

0345952A2 12/1989 European Pat. Off. .
1590379 6/1981 United Kingdom .

*Primary Examiner*—Stephen C. Buczinski
*Attorney, Agent, or Firm*—Fay, Sharpe, Beall, Fagan, Minnich & McKee

[57] ABSTRACT

A video encryption/decryption system in which lines of video information are stored in digitised form in a block of RAM memory, and are typically shuffled in groups of 32 lines by pivot reading information corresponding to 32 lines from the memory in a first predetermined order, which may for example be sequential order, and writing new input line information into the corresponding locations, and then reading from, and writing to, the memory in a second different order which may be random or pseudo-random, and subsequently repeating these two read/write operations alternately. This enables the line shuffling process to be achieved with a reduced memory requirement, compared with known methods.

15 Claims, 3 Drawing Sheets

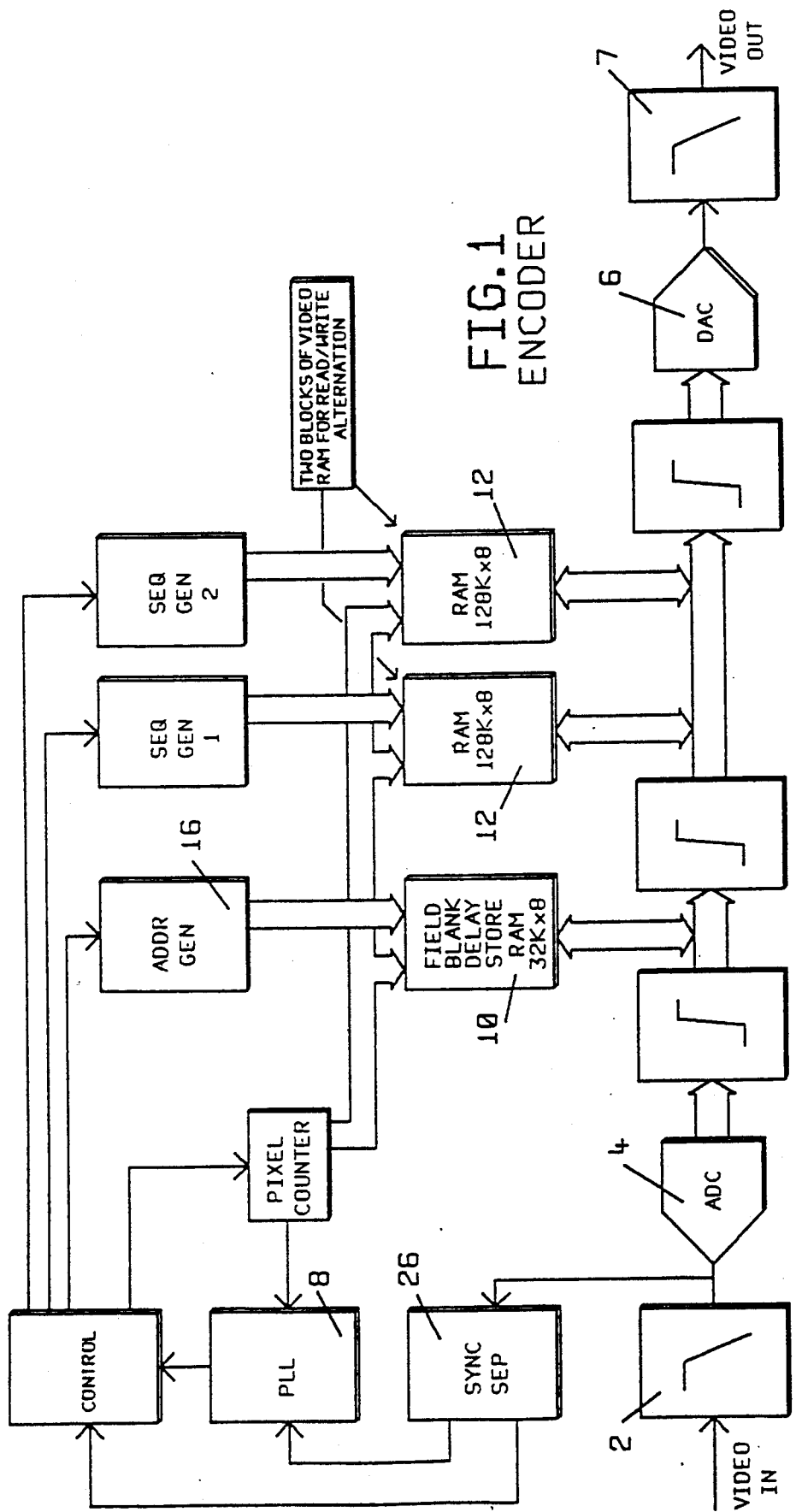

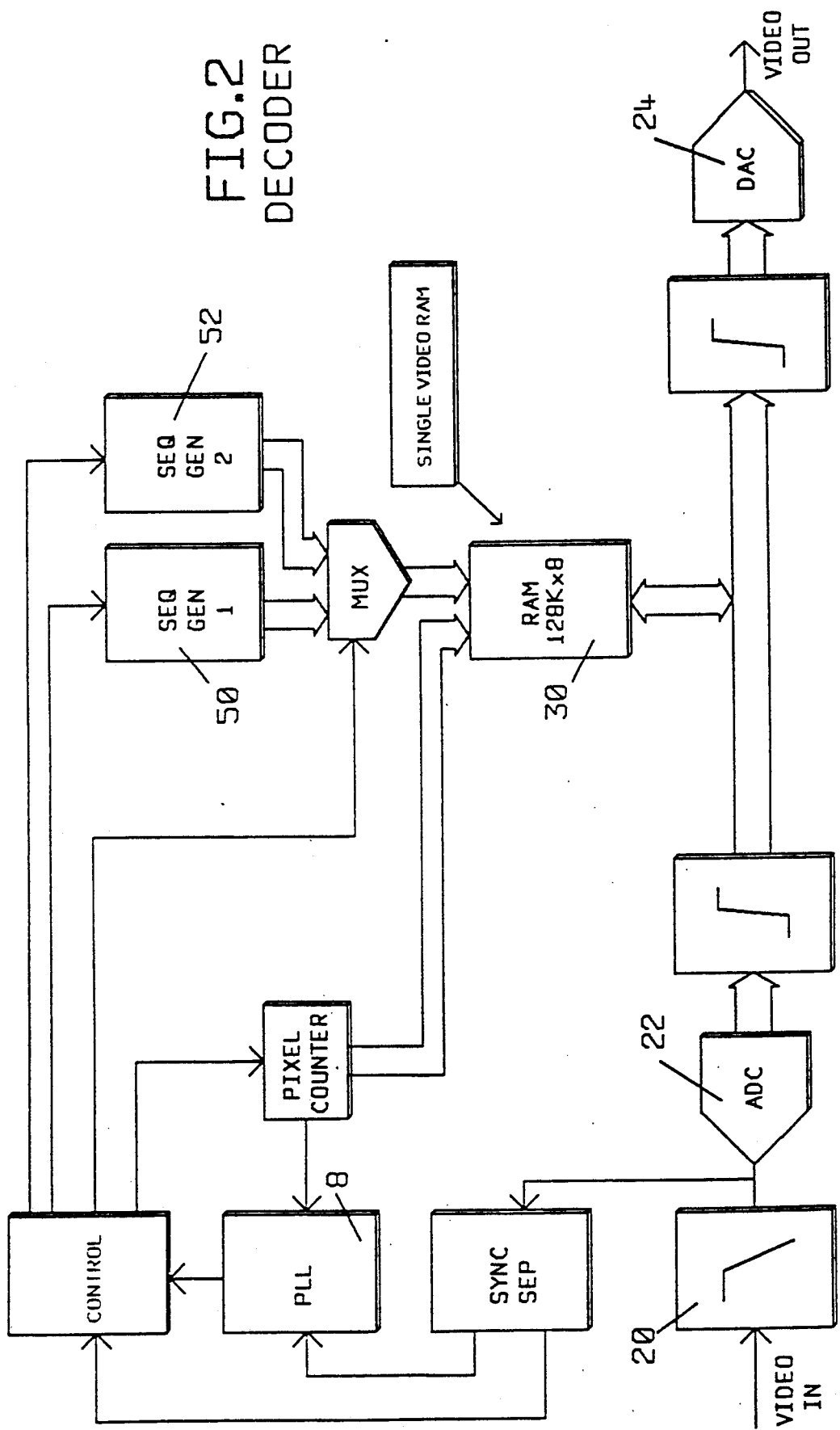
FIG.2 DECODER

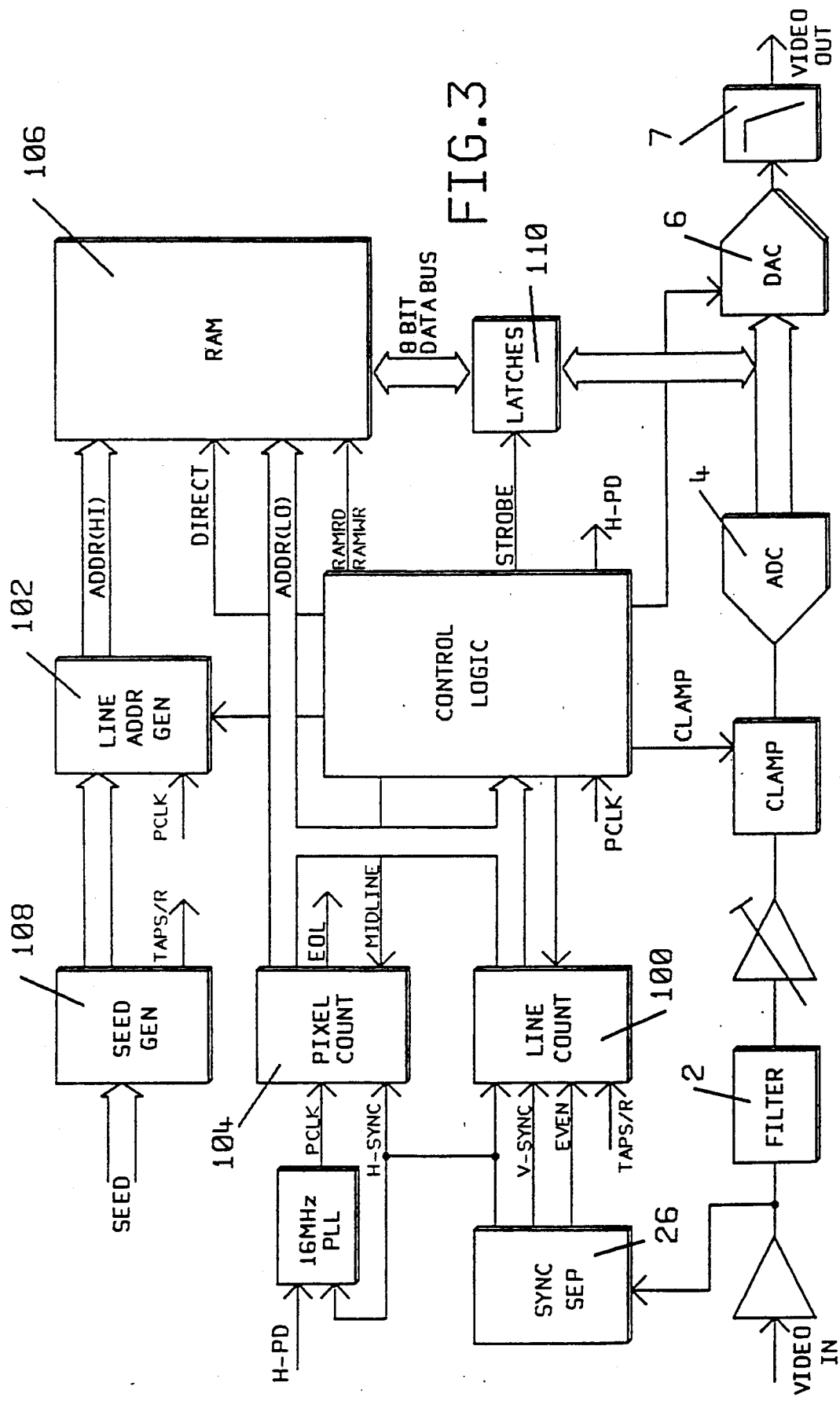

TELEVISION SCRAMBLER

This invention relates to the broadcasting and transmission of signals such as television signals, which are to be encoded for commercial or other purposes.

In the transmission of programmes for subscription systems such as satellite or cable television, it is desired to encode the signal in such a way that it cannot be properly received without a suitable decoder so that the viewer is obliged to pay for reception of the programmes. Various methods of encoding are known, one common method being to rearrange parts of the video signal. However many of the known methods suffer from technical overcomplexity and in particular it is desirable to reduce the complexity of the decoder which must be provided at the receiver or receiving station. Accordingly the present invention provides apparatus for encrypting or decrypting a signal comprising a series of values or groups of values, comprising a memory having a predetermined number of storage locations or groups of locations;

means for reading output values or groups of output values from, and writing new input values or groups of input values into, each of said locations or groups of locations in a first predetermined order until the said predetermined number is reached, and further reading output values or groups of output values from, and writing new input values or groups of values into, each of said locations or groups of locations in a second predetermined order until the said predetermined number is reached;

and control means for causing the reading and writing operations to be repeated alternately in the two said predetermined orders.

The invention also provides a method of encrypting or decrypting a signal comprising a series of values or groups of values, using a predetermined number of storage locations or groups of locations in a block of memory, the method comprising the steps of: (a) reading output values or groups of output values from, and writing new input values or groups of input values into, each of said locations or groups of locations in a first predetermined order until the said predetermined number is reached;

(b) reading output values or groups of output values from, and writing new input values or groups of values into, each of said locations or groups of locations in a second predetermined order until the said predetermined number is reached; and (c) subsequently repeating steps (a) and (b) alternately.

Preferably one order is sequential and the other order is random or pseudo-random. Particularly in the decoder the same block of RAM can thus be used for both storage and retrieval, rather than moving the line data between different RAMs, with the actual storage and retrieval process causing the "scrambling" rather than some additional intermediate process so as to provide a simplified and economical construction. However, for additional flexibility of operation, the encoder may utilise a shuffling memory comprising two blocks of RAN memory. Preferably, means are also provided for shifting the lines by a small percentage horizontally to further scramble the transmission.

Preferably the randomly variable order is determined by supplying a "seed" to a random or pseudo-random number generator, which may be changed periodically to provide a different random sequence. The random seed may be independently programmed into the coder and decoder or it may be regularly retransmitted so as to frequently "reprogram" the decoder.

One embodiment of the invention will now be described by way of example with reference to the accompanying drawings, in which:

FIG. 1 is a schematic block diagram of a signal encoder in accordance with the invention, FIG. 2 is a schematic block diagram of a decoder; and FIG. 3 is a more detailed block diagram of the decoder of FIG. 2.

ENCODER (FIG. 1)

General

The system will be described with reference to a PAL television broadcasting system, but it will be appreciated that it could also be applied to other systems such as NTBC.

The system digitises and stores 32 or 128 lines of normal video information and retrieves them in a different order, scrambling the incoming signal.

The lines are optionally shifted +/− 2.4% horizontally to further encode the picture.

The lines in vertical blank are not scrambled and are retrieved from a field blank store. This allows use with teletext transmissions and maintains correct vertical blank timings.

Samples are stored in 8-bit per pixel at 16 Mhz sampling rate. The whole of the video sisal is sampled including sync, colour burst and colour carrier signals.

Analogue Input

Referring firstly to FIG. 1, the incoming video signal is terminated, buffered, low-pass filtered (2) and sync tip clamped before being presented to the analogue to digital converter (4).

The low pass filter (2) has a cut off frequency which is such as to allow through video and color carrier information.

Sync tip clamping references all digitising to the composite sync level. Offset and gain potentiometers are provided for fine adjustment.

Over/under voltage results in peak white/Sync tip levels respectively. A LED provides indication of A-D over/under voltage for tuning of the gain and offset controls.

Analogue Output

After digital scrambling, the 8-bit digital data is passed to a D-A converter (6) and the output signal filtered (7) back down to 5.0 Mhz bandwidth.

Video Syncs & Master Clock

The incoming video contains composite frame and line synchronisation information container in the lower 0.3 volts transitions. The LM1881 device (26) provides separation of these signals and translation to TTL sync-separator levels.

It provides indication

Odd/Even field—used as the most significant bit of the line count.

Field sync signal—used to reset the line count

Composite sync signal—used to provide horizontal sync.

The composite sync output from this device still contains the original field sync serrations. These consist of double speed negative transitions during the field sync period. A signal LWNDW indicates which portion of the line the horizontal sync is expected and so is used to mask out the extra transitions.

The un-serrated line sync is passed to a Phase Locked Loop (PLL) (8) that compares its leading edge with the leading edge of the EOL signal. The EOL signal provides a positive pulse every 1024 pixels, thus the PLL will generate a 1024/64us=16 Mhz master pixel clock when the PLL is in lock. The PLL consists of edge triggered phase comparator, and an integrating R/C network. The Output voltage is used to control a crystal oscillator through a vari-cap diode. The VCO of the PLL chip is not used due to its wide lock range and hence relative instability.

The oscillator control voltage is monitored by a pair of voltage comparators to give indication when the PLL is within its locking range. The RANGE LED comes ON when the PLL is locked and in range.

A shuffling store comprising two blocks of 32 kb Static RAM devices (12) provide storage for 32 lines. Although the same operational effect can be achieved utilising a single block of RAM as in the corresponding decoder construction (to be described below) the arrangement shown here provides greater flexibility of operation for the encoder. Each line is allocated 1024 bytes although only 1004 bytes are actually used. (20 pixels are 'lost' in the line shifting mechanism).

The static RAM has an access time of 120 nSesc. The video is digitised at a rate of 16 Mhz=62.5 nSecs. In order to store the data as it arrives and to also allow time to retrieve the encoded samples, the RAM is organised in a 32 bit long word (4 bytes at a time). The incoming samples are transferred to memory in anti-phase to sample retrieval. Retrieval also occurs 32 bits at a time and is then assembled into 8 bit bytes to provide the output data stream.

A field blank store (10) provides a shift forward of video data relative to the field bank interval. This is to compensate for the Decode de-scrambling delay relative to the field blank period. This feature removes the need for the de-scrambler to delay the field blank information to align with the de-scrambled video, thus simplifying the decoder.

After the field blank delay, the video is alternately stored/retrieved in/from one of the two shuffling stores (12). Store and retrieve addresses are generated (16) independently in the encoder to produce the correct sequence for the decoder to de-scramble using its simple single address architecture.

Line Shuffling

The lines are shuffled by storing the digitised data in a different RAM location to which they are subsequently retrieved. Encryption is the difference between the stored and retrieved locations.

If the line counter oscillated between just two different sequences, the video would be encrypted but would not give a good appearance of continuously varying shuffling. A static picture may still be discernible through the shuffling.

The preferred method of avoiding this is to continuously increment an offset to one of the two sequences. Thus the relative difference between the stored and retrieved locations is very different from one store/retrieve cycle to the next.

The randoming 'SEED' for this encryption is the initial starting offset to the alternate sequence.

If there are 32 lines accessed through 2 sequences running through 32 offset positions, there will be repetition rate of 2048 lines.

Field blank lines are not shuffled, therefore 576 lines per frame become shuffled. The shuffling sequence will not return to the start of a whole frame until the lowermost common denominator of 2048 and 576=32 frames. Thus the total shuffling sequence will only repeat every 32 frames.

Every 32 frames the encoder sends a peak white line of video on a line designated for synchronisation purposes. This synchronises the decoder sequence with the encoder. The decoder will cycle round the correct sequence with or without further receipt of this pulse.

Line Shifting

Line shifting is performed by stopping the storage retrieval pixel count during the blanking period in the front/back porches.

Each line pixel count is stopped for 20 pixels at either the beginning of the active video or at the end, depending on the level of the least significant bit of the line shuffling code.

If the line was stored with the counter stopped at the beginning and retrieved with the counter stopper at the end, then the displayed line will be left shifted.

If the line was stored with the counter stopped at the end and retrieved with the counter stopped at the beginning, then the displaced line will be right shifted.

If storage and retrieval had the count stopped at the same point, then there will be no nett shift at the display. This means that there is twice the probability of no shift, than of a left or right shift.

Left/right shift selection is made from a signal derived from the line shifting sequence. This signal toggles on positive transitions of the least significant line count address.

There is no line shifting during field blank.

DECODER: FIG. 2

General

The decoder is generally similar to the encoder, but the construction is simplified by the use of a single "line-shuffling" RAM (30).

The decoder digitised and stores 32 lines of scrambled video information and retrieves them in a different order, unscrambling the incoming signal. The lines are shifted up to +/− 2.4% horizontally in anti-phase to the scrambled signal to completely restore the picture. The lines in vertical blank are not expected to be scrambled and bypass the de-scrambler. This allows use with teletext transmission and maintains correct vertical blank timings. Samples are stored in 8-bit per pixel at 16 Mhz sampling rate. The whole of the video signal is sampled including sync, colour burst and colour carrier signals.

Analogue Input

The incoming video signal is terminated, buffered, low-pass filtered (20) and black level clamped before being presented to the analogue to digital converter (22). The low pass filter has a cut off frequency of 5.0 Mhz allowing through video and colour carrier information. Black level clamping references all digitising to the input level immediately after the colour burst and before the display portion of each line. Offset and gain potentiometers are provided for fine adjustment. Over- /under voltage results in peak white/Sync tip levels respectively. A LED provides indication of A-D over-/under voltage for tuning of the gain and offset controls.

Analogue Output

After digital de-scrambling, the 8-bit digital data is passed to a D-A converter (24) and the output signal is filtered back down to 5.0 Mhz bandwidth.

Video Syncs & Master Clock

The incoming video contains composite frame and line synchronisation information contained in the lower 0.3 volts transition. The LM1881 device (26) provides separation of these signals and translation to TTL levels.

It provides indication of:
Odd/Even field—used as the most significant bit of the line count.
Field sync signal—used to reset the line count.
Composite sync signal—used to provide horizontal sync.

The composite sync output from this device still contains the original field sync serrations. These consist of double speed negative transitions during the field sync period. A signal LWNDW indicates which portion of the line the horizontal sync is expected and so is used to mask out the extra transitions.

The unserrated line sync is passed to a Phase Locked Loop (PLL) (8) that compares its leading edge with the leading edge of the EOL signal. The EOL signal provides a positive pulse every 1024 pixels, thus the PLL will generate a 1024/64us=16 Mhz master pixel clock when the PLL is in lock. The PLL consists of edge triggered phase comparator, and an integrating R/C network. The output voltage is used to control a crystal oscillator through a vari-cap diode. The VCO of the PLL chip is not used due to its wide lock range and hence relative instability.

The oscillator control voltage is monitored by a pair of voltage comparators to give indication when the PLL is within its locking range. The RANGE LED comes ON when the PLL is locked and in range.

A shuffling store comprising one block of 32 kb Static RAH devices (30) provide storage for 32 lines. Each line is allocated 1024 bytes although only 1004 bytes are actually used. (20 pixels are 'lost' in the line shifting mechanism).

The Static RAM has an access time of 120 nSesc. The video is digitised at a rate of 16 Mhz=62.5 nSecs. In order to store the data as it arrives and to also allow time to retrieve the de-coded samples, the RAM is organised in a 32 bit long word (4 bytes at a time). The incoming samples are transferred to memory in antiphase to sample retrieval. Retrieval also occurs 32 bits at a time and is then assembled into 8 bit bytes to provide the output data stream. The store and retrieve addresses are the same for each 32 line cycle. Successive 32 line cycles of storage and retrieval are alternately linear and random and the lines are unshuffled as a result of this because retrieval always occurs before storage. Thus the order in which lines are stored/retrieved changes between one 32 line group and the next. Thus lines are always retrieved from a different relative position on subsequent accesses.

FIELD BLANK

During frame blanking, the incoming data is not stored in memory and is passed directly through the decoder with a delay equivalent to that of a store/retrieval memory cycle. This allows use with teletext transmission and maintains correct vertical blank timings. It will also be appreciated that this simplifies the decoder by comparison with the encoder. The decoder operates a buffer full in arrears, therefore when the field blank arrives and scrambled storage is held off, it must have lines for displaying immediately after the blank period, already in its buffer. In other words, the incoming video must be delayed relative to field blank.

Line Shuffling

The lines are unshuffled by storing the digitised data in a different RAM location to which they are subsequently retrieved. Because storing and retrieval occur with the same address, the line counter must include two different sequence generators (50, 52). Thus encryption is the difference between the stored and retrieved locations.

If the line counter oscillated between just two different sequences, the video would be encrypted but would not give a good appearance of continuously varying shuffling. A static picture may still be discernible through the shuffling.

The method adopted is to continuously increment an offset to one of the two sequences. Thus the relative difference between the stored and retrieved locations is very different from one store/retrieve cycle to the next.

The randoming 'SEED' for this encryption is the initial starting offset to the alternate sequence.

There are typically 32 lines accessed through 2 sequences running through 32 offset positions, giving a repetition rate of 2048 lines. Field blank lines are not shuffled, therefore 576 lines per frame become shuffled. The shuffling sequence will not return to the start of a whole frame until the lowest common denominator of 2048 and 576=32 frames. Thus the total shuffling sequence will only repeat every 32 frames. Every 32 frames the encoder sends a peak white line of video on a video line designated for synchronisation purposes. This synchronises the coder sequence with the encoder. The decoder will cycle round the correct sequence with or without further receipt of this pulse.

LINE SHIFTING

Line shifting is performed by stopping the storage/retrieval pixel count during the blanking period in the front/back porches.

Each line pixel count is stopped for up to 20 pixels at either the beginning of the active video or at the end, depending on the level of the least significant bit of the line shuffling code. If the line was stored with the counter stopped at the beginning and retrieved with the counter stopped at the end, then the displayed line will be left shifted. If the line was stored with the counter stopped at the end and retrieved with the counter stopped at the beginning, then the displayed line will be right shifted.

If storage and retrieval had the count stopped at the same point, then there will be no nett shift at the display. This means that there is twice the probability of no shift, than of a left or right shift.

There is no line shifting during field blank.

As a guide to the various control signals used in the circuit, reference will be made to FIG. 3 which actually illustrates details of the decoder but in which the control signals are of course very similar for both coding and decoding.

Frame Control (FIG. 3)

The FRAME-PEEL (100) receives the separated Sync signals from the LM1881 (26). It can therefore determine events during the frame period to line resolution. It provides indication of when field blanking requires the decoder to pass incoming video straight through - FBLNK. It also provides the serrated sync filtering on Composite Sync to provide HSYNC for the PLL to lock onto, and the 'LINE' window to test for the peak white line sequence initialisation signal. This results in /LEAD restarting the scrambling sequence whenever the synchronisation pulse occurs.

Line Control

The LINE-PEEL (102) is programmed to operate as either a 5/7-bit shift register with pre-set and hold, or as a 5/7-bit binary counter.

The shift register input is derived from the Exclusive-OR of shift register bits 0 and 2. The shift register connected in this fashion produces a pseudo-random sequence of all 32 values except 00. The register is therefore modified to inject the value 00 into the code to provide a full 32 state sequence. The binary counter is connected with its bits in reversed order to provide a nonlinear sequence. The line shuffling function is performed by alternately using the two sequences to address the memory (108). The relationship between the sequences provides the scrambling. The relationship is constantly varied by leading an incrementing offset into the shift register sequence.

The LINE-PEEL is attached to a counter incremented every 32 lines. This counter may be 'SEED-ed' (108) by a DIP switch giving it a different start position. The counter is reloaded by the sequence initialising LOAD signal. The LSB of this counter is used to select between either the pseudo random shift register sequence or the binary sequence. The shift register is loaded with the remaining counter bits to provide the rotating offset that continuously varies the scrambling sequence.

This process is held during field blank when the incoming video is passed directly through.

Pixel Control

The PIXEL-PEEL (104) controls the CLOCK and RESET inputs of a counter used as the least significant RAM address. the RAM address is incremented every 4 pixels (32 bits).

The counter is reset at the end of the line.

The counter is fed back into the PEEL enabling it to determine the position of various signals with the line period to a resolution of 4 pixels.

MIDLINE indicates when it is valid to sample the MSB of the digitised video for the 32-frame sequence synchronisation signal.

CLAMP indicates the black level clamping period.

LWNDW provides the composite sync serration mask for extraction of HSYNC.

The PIXEL-PEEL provides the horizontal shift function by stopping the address counter either at the beginning or end of the line during the blanking period. A 3-bit counter (8C0/1/3) counts off the 5×4 pixel delay before the address counter is re-enabled. The LSB of the line counter, AB, selects the start/end stop position.

Signals requiring the accurate positioning within the line take into account the different count values in left/-right shifted lines.

Latch Control

A LATCH-PEEL (110) is used to co-ordinate the transfer of the 8-bit A/D and D/A data into the 32 bit RAM data. STRB0, STRB1, STRB2, STRB3 clock incoming A/D samples into the appropriate 8 bit data latch. /RAMWR enables the outputs of these data latches to provide the data to be written into memory, 4 pixels (32 bits) at a time. During the read phase, 4 pixels (32 bits) are retrieved from RAM and stored in 4 data latches. The same STRB1,2,3,0 signals are used to output enable the latches one at a time to produce the single pixel (8 bit) output stream. During field blanking, the incoming data is passed directly through the latches without being stored in RAM. In order to provide the same timing relationship between store and retrieve, the/RAMRD signal runs at double time and RAMWR is kept asserted.

DIRECT disables the RAM during field blanking.

Decode Enable

The PAL-DeCode senses if the sequence synchronising pulse occurs within a 64-frame time period. If it does not occur, it is assumed that the signal is not scrambled, decoding is disabled and the DECODE LED is extinguished. The DECODE switch disables all decoding when in the off position.

This allows automatic compatibility with non-encrypted video.

Signal Definitions—(FIG. 3)

The following gives definitions of signal names that help in the understanding of circuit operation. The following signals are grouped according to the originating PLD) Programmable Logic Device). It will be appreciated that similar definitions are also applicable to the encoder.

| FRAME-PEEL | |
| --- | --- |
| Signal Name | HSYNC |
| Source | FRAME-PEEL |
| Destination | PLL |
| Type | Active HIGH |
| Description | Line synchronisation signal extracted from the composite sync input |
| Function | Rising edge is PLL to pixel count value to lock master PCLK and system timings to incoming video |
| Signal Name | PCLK |
| Source | VCO |
| Destination | All peels except LINE, A-D converter |
| Type | Active HIGH clock |
| Description | 16 Mhz clock PLL to incoming line sync |
| Function | Provides master sampling and control clock. Most PEELS operate from this clock to provide alignment of control signals. |
| Signal Name | FBLNKS/R |
| Source | FRAME-PEEL |
| Destination | LINE32 line counter, LINE-PEEL and latch control. |
| Type | Active high |
| Description | Asserted when in field blank. |
| Function | Disables the scrambling processes. Stops memory transfers during field blank. Enables the field blank store output. |

-continued

| | |
|---|---|
| Signal Name | /LOADS/R |
| Source | FRAME-PEEL |
| Destination | LINE32 line counter, sequence offset counter and LINE-PEEL |
| Type | Active low. |
| Descritpion | Asserted when peak white video occurs on line 16. |
| Function | Provides sequence synchronisation between Encoder and decoder. Resets the LINE32 count, re-loads the SEED and intialises the LINE-PEEL. |
| Signal Name | /EVEN |
| Source | LM1881 |
| Destination | FRAME-PEEL |
| Type | Active low. |
| Description | Asserted on even fields. |
| Function | Provides the most significant bit of the line count. |

LINE-PEEL

| | |
|---|---|
| Signal Name | S/RAB-S/RA14 |
| Source | LINE-PEEL |
| Destination | RAM. |
| Type | Store/retrieve address bus. |
| Descritpion | 5-bits - 32K RAM, 7-bits 128K RAM. Counts through pseudo random sequence |
| Function | Provides line shuffling addresses for store/retrieval. |
| Signal Name | /LINE32S/R |
| Source | LINE32 counter. |
| Destination | Sequence offset counter and LINE-PEEL |
| Type | Active LOW. |
| Description | Asserted every 32 lines. |
| Function | Increments the sequence offset counter. Loads the sequence offset into the LINE-PEEL. |
| Signal Name | TAPS/R |
| Source | Sequence offset counter. |
| Destination | LINE-PEEL |
| Type | Active High. |
| Description | Asserted on alternate 32 lines. |
| Function | Selects between either SREG or binary addressing sequence. |

PIXEL-PEEL

| | |
|---|---|
| Signal Name | /MIDLINE |
| Source | PIXEL-PEEL |
| Destination | FRAME-PEEL |
| Type | Active Low. |
| Description | Asserted during the active video portion of the line. |
| Function | Provides the frame PEEL with a window to sample line 16 to produce the LOAD sequence initialisation signal. |
| Signal Name | /CLAMP |
| Source | PIXEL-PEEL |
| Destination | Black level clamping circuitry. |
| Type | Active Low. |
| Description | Asserted during black level horizontal back porch. |
| Function | Allows the clamping circuitry to set the video signal black level to a set reference. |
| Signal Name | /LWNDW |
| Source | PIXEL-PEEL |
| Destination | FRAME-PEEL |
| Type | Active Low. |
| Description | Asserted when the incoming line sync is expected. |
| Function | Masks out serrated snycs. |
| Signal Name | /HOLDS/R |
| Source | PIXEL-PEEL |
| Destination | Internal Signal |
| Type | Active Low. |
| Description | Asserted at the beginning or end of the line depending on the state of the LSbit of the line sequence. |
| Function | Stops the pixel count address counter clock. This provides the horizontal shift encoding. |
| Signal Name | SC0,1,2S/R |
| Source | PIXEL-PEEL |
| Destination | Internal signal |
| Type | Active high count. |
| Description | Counts from 0–4 when HOLD is asserted. |
| Function | Provides a 5 × 4 pixel count for horizontal line shift delay. Hold is released when the counter reaches 4. |
| Signal Name | /4PCLK |
| Source | PIXEL-PEEL |
| Destination | RAM address counter |
| Type | Active Low clock. |
| Description | Asserted every 4 pixels when hold is not asserted. |
| Function | Increments least significant address counter. |
| Signal Name | EDL |
| Source | PIXEL-PEEL |
| Destination | FRAME-PEEL, LINE-PEEL, LINE32 counter, PLL Pixel counter. |
| Type | Active high. |
| Description | Asserted for 4 pixels at the end of a line. |
| Function | Used on all line dependent functions. Increments the line32 counter, strobes FBLNK, counts through the line sequence and is compared with HSYNC in the PLL. |

LATCH-PEEL

| | |
|---|---|
| Signal Name | /RAMRD |
| Source | LATCH-PEEL. |
| Destination | Latches the retrieved RAM data. |
| Type | Active Low |
| Description | Asserted on the retrieve memory phase. Asserted on alternate pixels during field blank. |
| Function | Latches the retrieved data out of the RAM. Runs double time during field blank to give correct timing when samples are passed straight through. |
| Signal Name | /RAMWR |
| Source | LATCH-PEEL |
| Destination | RAM and store latches |
| Type | Active low. |
| Description | Asserted during the store memory phase. Low during field blanking. |
| Function | Enables the write latch outputs and enables the RAM for write. |
| Signal Name | /STRB01,2,3 |
| Source | LATCH-PEEL |
| Destination | Read/write latches, PIXEL-PEEL. |
| Type | Active Low. |
| Description | Walking bit pattern. Four phase sequence. |
| Function | Strobes write data into the write latches and enables the outputs of the READ latches. STRB0 is used as the 4-pixel count enable. All timings become aligned to STRB0. |
| Signal Name | /DIRECT |
| Source | LATCH-PEEL |
| Destination | RAM |
| Type | Active High. |
| Description | Asserted during field blank (/MIX) and aligned with 4PCLK. |
| Function | Disables RAM during DIRECT feeding of input to output during field blanking. |

RAM CONTROL

| | |
|---|---|
| Signal Name | /LOCS |
| Source | RAM - Control PEEL |
| Destination | Low RAM buffer. |
| Type | Active low. |
| Description | Asserted during a store/retrieve access to the LOW bank of RAM. |
| Function | Enables the low RAM. |
| Signal Name | /HICS |
| Source | RAM-Control PEEL. |
| Destination | High RAM buffer. |
| Type | Active low. |
| Description | Asserted during a store/retrieval access to the High bank or RAM. |
| Function | Enables the high RAM. |
| Signal Name | /BLCS |
| Source | RAM-Control PEEL |
| Destination | Blank RAM buffer |
| Type | Active low |
| Description | Asserted during a store/retrieval access to the BLANK bank of RAM. |
| Function | Enables the BLANK RAM. |

We claim:

1. Apparatus for encrypting or decrypting a signal comprising a series of values or groups of values, comprising a memory having a predetermined number of storage locations or groups of locations;

means for reading output values or groups of output values from, and writing new input values or groups of input values into, each of said locations or groups of locations in a first predetermined order until the said predetermined number is reached, and further for reading output values or groups of output values from, and writing new input values or groups of values into, each of said locations or groups of locations in a second predetermined order until the said predetermined number is reached;

and control means for causing the reading and writing operations to be repeated alternately in the two said predetermined orders.

2. Apparatus according to claim 1 in which the signal comprises a digitized video signal, whereby the apparatus can be used to shuffle or unshuffle the lines of a television picture.

3. A video encryption system according to claim 1 in which one of the said orders is sequential and the other is random or pseudo-random.

4. A video encryption system according to claim 2 further comprising means for shifting the lines by a small percentage horizontally.

5. A system according to claim 1 in which each storing location or group of locations provides a buffer of at least 32 lines of 1024 bytes each.

6. A system according to claim 2 in which a further level of encryption is applied to the line shuffling by continuously incrementing an offset to one of the said ordering sequences, so that the relative difference between the stored and retrieved locations is different from one storage/retrieval cycle to the next.

7. A system according to claim 6 in which the said offset is varied in accordance with a further random or pseudo-random sequence.

8. A system according to claim 3 in which the, or each, random sequence is generated by means of a "seed" supplied to a random number generator, which is changed periodically to generate different sequences.

9. A system according to claim 6 in which the, or each, random sequence is generated by means of a "seed" supplied to a random number generator, which is changed periodically to generate different sequences.

10. A system according to claim 2 in which the lines are shifted horizontally by stopping an associated pixel count for a preset number of pixels either at the beginning or the end of the active video signal, whereby if a line is stored with the counter stopped at the end, the displayed line is left shifted, and alternatively, if the line is stored with the counter stopped at the end and retrieved with the counter stopped at the beginning, the line is right shifted.

11. A method of encrypting or decrypting a signal comprising a series of values or groups of values, using a predetermined number of storage locations or groups of locations in a block of memory, the method comprising the steps of:

(a) reading output values or groups of output values from, and writing new input values or groups of input values into, each of said locations or groups of locations in a first predetermined order until the said predetermined number is reached;

(b) reading output values or groups of output values from, and writing new input values or groups of values into, each of said locations or groups of locations in a second predetermined order until the said predetermined number is reached; and (c) subsequently repeating steps (a) and (b) alternately.

12. A method according to claim 11 in which one of the said predetermined orders is sequential whilst the other is random or pseudo-random.

13. A method according to claim 11 in which the said predetermined orders comprise two different random or pseudo-random sequences.

14. A method according to claim 12 in which the signal comprises a series of groups of values in which each group represents a line of video information.

15. A method according to claim 14 in which the predetermined number of groups of locations is 32, whereby the encryption/decryption process results in the video signal being "shuffled" or unshuffled in batches of 32 lines.

* * * * *